C. Avery,
Sawing Stone.
N° 15,115. Patented June 17, 1856.
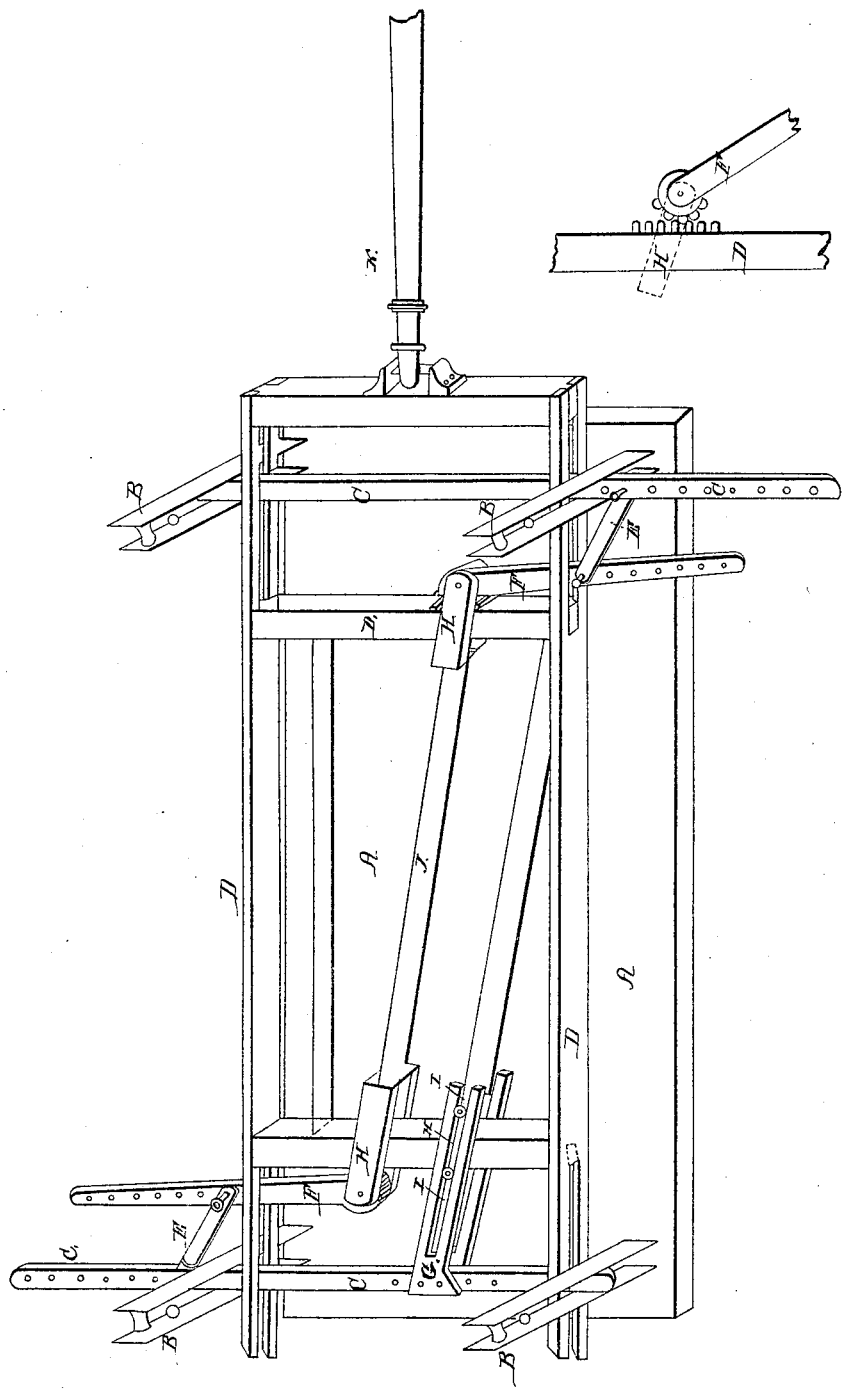

UNITED STATES PATENT OFFICE.

CYRUS AVERY, OF TUNKHANNOCK, PENNSYLVANIA.

MARBLE-SAWING MACHINE.

Specification of Letters Patent No. 15,115, dated June 17, 1856.

*To all whom it may concern:*

Be it known that I, CYRUS AVERY, of Tunkhannock, in the county of Wyoming and State of Pennsylvania, have invented a new and useful Machine for Sawing on a Taper Both Sides of a Block of Marble at Once; and I do hereby declare that the following is a full and exact description thereof, reference being had to the accompanying drawings and the letters of reference marked thereon.

The nature of my invention consists in the peculiar arrangement of the parts to give the desired lateral motion to the saws.

A is a bed-frame or plate for supporting the block to be sawed and also to support the posts or studs B, said posts or studs to operate as guides to the perpendicular movements of the saw-frame and also as guides to the sliding-bars C. Two of said studs B are to have a longitudinal groove upon the inner side to receive one end of the sliding-bar C, and the other two sides are formed with slots, through which the sliding bars pass at their other ends. The office of these sliding-bars is to guide the saw-frame when in motion and also to receive and keep in position one end of the vibrating link E. There are bolt holes in the slide bars at equal distances apart for the purpose of moving the regulating link E, in order to regulate, by increasing or diminishing the lateral movement of the saw, in order to give the desired width and taper of the stone to be sawed.

D is the saw-frame formed of sheet iron or other metal cut to the width of about twelve inches and long enough to receive the saw and to extend at each end so far beyond the cross-pieces of the saw-frame as to form guides for the saw-frame. These plates, forming the saw-frame are stiffened by bending in the center of the plate and raising the edges, so as to resemble, when formed, the letter U. The cross-pieces are attached to the side pieces by cutting out a lip at each end out of the rounding side, and by bending the lip into the groove or hollow part of the side pieces and the plate part over the side pieces and turning the ends in over the edges of the side pieces, forming a chuck or double lock. The side pieces of the frame from the cross-pieces are cut out, forming slots for guides to the frame, in connection with the slide bars C.

E is the connecting link between the slide bars C and the lever F, which passes through the slot in the saw-frame, and is attached to the frame by the movable stirrup H, having teeth or cogs upon the inner side of the rounded end to mesh into the stationary rack upon the saw frame D, so that when the saw frame is set in motion, the saw will be enabled to work in a straight line to suit any desired taper.

H is the stirrup passing over the cross-pieces of the saw-frame and extending outward far enough to receive the head of the toothed lever F.

J is the saw, made in the usual way.

K is the connecting rod attached to the saw frame in the usual way.

What I claim as my invention and desire to secure by Letters Patent, is—

The combination of the slide bars C, link E, lever F, with the rack and movable stirrup H, the whole being constructed, arranged and operated in the manner and for the purpose set forth and not otherwise.

CYRUS AVERY.

Witnesses:
 IRVING WHEELOCK,
 IRA AVERY.